(12) United States Patent
Trim et al.

(10) Patent No.: US 10,735,891 B1
(45) Date of Patent: Aug. 4, 2020

(54) COGNITIVELY CONTROLLING DATA DELIVERY

(71) Applicant: INTERNATIONAL BUSINESS MACHINES CORPORATION, Armonk, NY (US)

(72) Inventors: Craig M. Trim, Ventura, CA (US); Kimberly Greene Starks, Nashville, TN (US); Michael E. Alexander, Great Falls, VA (US); Gandhi Sivakumar, Melbourne (AU); Kushal Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/519,582

(22) Filed: Jul. 23, 2019

(51) Int. Cl.
| | | |
|---|---|---|
| *H04W 4/021* | (2018.01) | |
| *H04W 4/50* | (2018.01) | |
| *H04W 4/029* | (2018.01) | |
| *H04W 28/20* | (2009.01) | |
| *H04W 28/12* | (2009.01) | |
| *H04W 28/02* | (2009.01) | |

(52) U.S. Cl.
CPC ........... *H04W 4/021* (2013.01); *H04W 4/029* (2018.02); *H04W 4/50* (2018.02); *H04W 28/0268* (2013.01); *H04W 28/12* (2013.01); *H04W 28/20* (2013.01)

(58) Field of Classification Search
CPC ................................ H04W 4/90; H04W 28/02
USPC ...... 455/456.1, 404.2, 425, 422.1, 423, 449; 370/252
See application file for complete search history.

(56) References Cited

U.S. PATENT DOCUMENTS

| | | | |
|---|---|---|---|
| 9,557,889 B2 | 1/2017 | Raleigh et al. | |
| 9,955,332 B2 | 4/2018 | Raleigh et al. | |
| 2004/0236547 A1 | 11/2004 | Rappaport | |
| 2015/0334523 A1* | 11/2015 | Lappetelainen | ........ H04W 4/80 455/456.1 |

(Continued)

FOREIGN PATENT DOCUMENTS

| | | |
|---|---|---|
| WO | 2001020876 A9 | 10/2002 |
| WO | 2015131119 A1 | 9/2015 |

OTHER PUBLICATIONS

Anonymous; Central Recall/Information Hub; IPCOM000236484D; Apr. 29, 2014; 2 pages.

(Continued)

*Primary Examiner* — Kiet M Doan
(74) *Attorney, Agent, or Firm* — Schmeiser, Olsen & Watts; Brian M. Restauro

(57) ABSTRACT

An approach is provided for cognitive control of channel bandwidth. Devices connected to access point(s) of a network are detected. Locations of the devices are detected. Based on (i) the devices being connected to the access point(s) and (ii) the locations of the devices, a gathering of people is detected as a group of users who are operating the detected devices at a current time within a geographical area that includes the locations of the devices. Data access patterns of the devices are detected. Based on the detected data access patterns and the gathering of people being detected, a quality of service class identifier (QCI) is updated from a normal setting to a new setting to satisfy bandwidth requirements of the devices.

21 Claims, 4 Drawing Sheets

(56) References Cited

U.S. PATENT DOCUMENTS

| | | | |
|---|---|---|---|
| 2016/0157060 A1* | 6/2016 | Wyles | H04W 24/08 455/456.1 |
| 2017/0067747 A1 | 3/2017 | Ricci | |
| 2019/0116402 A1* | 4/2019 | Long | H04N 21/64738 |

OTHER PUBLICATIONS

Anonymous; Notification Management Across Devices; IPCOM000252936D; Feb. 22, 2018; 11 pages.

Anonymous; System for Detecting and/or Locating Portable Objects Using Beacon Devices; IPCOM000255137D; Sep. 4, 0218; 22 pages.

BEC Technologies; Quality of Service (QoS) in LTE; retrieved from the Internet Jul. 25, 2018; http://www.bectechnologies.net/main/newsletter_images/QoS.pdf; 3 pages.

EUROSTAT; Power from Statistics: Data, Information and Knowledge—Outlook Report; 2018 Edition; 198 pages.

Mullins, Robert et al. (Editors); Cognitive Network Management in 5G; Mar. 9, 2017; 40 pages.

Wikipedia; QoS Class Identifier; retrieved from the Internet Jul. 25, 2018; https://en.wikipedia.org/wiki/QoS_Class_Identifier; 3 pages.

Windancer; Bearers, default Bearers, dedicated Bearers—naughty Bearers; Jan. 25, 2010; https://windancersth.wordpress.com/2010/01/25/bearers-default-bearers-dedicated-bearers-naughty-bearers/comment-page-1/; 11 pages.

\* cited by examiner

COGNITIVELY CONTROLLING DATA DELIVERY

The present invention relates to cognitively controlling data delivery in a network, and more particularly to a cognitive allocation of bandwidth among channels in a 5G telecom network.

Advancements in the telecommunication industry has been a key enabler for many technologies, including artificial intelligence (AI), to succeed by breaking the barrier of various factors, such as sedentary operations, lower bandwidth, etc. 4G telecommunication technology has pushed these technologies to an upper stratum by parallelizing the physical channel, which results in higher bandwidth. 5G telecommunication technology can serve as a rich enabler to push the aforementioned technologies to even higher levels through features such as a mobility bandwidth of 1 gigabyte per second (GBPS), convergence of Internet of Things (IoT) device access, etc. One of the key features of 5G is the network itself being intelligent and cognitive. Thus, the 5G network can be a part of the human community through various features including observing the surroundings, reasoning, inferring, and making decisions like humans.

A known bandwidth reallocation technique provides "a process of dynamically allocating a bandwidth capacity of a network among logical network segments (LNSs) of the network" which "can include determining for each of the LNSs a new traffic rate of datagrams passing through a common interface to or from the LNS" and "reallocating the bandwidth capacity among the LNSs upon detecting a change criteria with respect to one of the new traffic rates," U.S. Patent Application Publication No. 2105/0282180, "Dynamic allocation of network bandwidth," filed Feb. 26, 2015, paragraph [0003].

Known network bandwidth allocation techniques lack a mechanism for a fine-grained reallocation of network bandwidth to efficiently accommodate bandwidth requirements of computing devices being used by a large, unexpected gathering of people.

SUMMARY

In one embodiment of the present invention, a first computer-implemented method is provided. The method includes detecting, by one or more processors, devices connected to one or more access points of a network. The method further includes detecting, by the one or more processors, respective locations of the devices. The method further includes based on (i) the devices being connected to the one or more access points and (ii) the locations of the devices, detecting, by the one or more processors, a gathering of people as a group of users who are operating the detected devices at a current time within a geographical area that includes the locations of the devices. The method further includes detecting, by the one or more processors, respective data access patterns of the devices. The method further includes based on the detected data access patterns and the gathering of people being detected, updating, by the one or more processors, a quality of service class identifier (QCI) from a normal setting to a new setting to satisfy bandwidth requirements of the devices.

The aforementioned embodiment providing the first computer-implemented method advantageously provides a cognitive allocation of intra-channel bandwidth by switching QCI characteristics to satisfy bandwidth requirements in a manner that is faster and more fine-grained, accurate, and reliable than existing network bandwidth allocation techniques. The cognitive allocation of intra-channel bandwidth may be integrated with an Internet of Things environment to improve asset maintenance, utilization, and performance management (e.g., in an open analytics solution for energy and utility companies).

In one optional aspect of the present invention, the cognitive allocation of intra-channel bandwidth includes retrieving historical data specifying an expected number of people to be in the geographic area at a time that matches the current time. It is determined that the group of users has a first total number of users that exceeds the expected number of people by at least a threshold amount. The step of detecting the gathering of people is further based on the group of users having the first total number of users that exceeds the expected number of people by at least the threshold amount. Subsequent to the step of updating the QCI, device(s) are detected as becoming disconnected from the one or more access points, leaving a proper subset of the devices connected to the one or more access points. The proper subset of the devices is operated by a proper subset of the users. It is determined that the proper subset of the users has a second total number of users that does not exceed the expected number of people by at least the threshold amount. In response to determining that the proper subset of the users has the second total number of users that does not exceed the expected number of people by at least the threshold amount, the QCI is restored to the normal setting. The aforementioned aspect of the present invention advantageously provides quick and efficient cognitive allocations of network bandwidth, including allocations based on a dispersal of a gathering of people.

In one optional aspect of the present invention, the cognitive allocation of intra-channel bandwidth includes determining a type of an event for which the gathering fop people has assembled. The step of updating the QCI is further based on the type of the event. The aforementioned aspect of the present invention advantageously provides cognitive allocations of network bandwidth, where the allocations vary based on the type of the event for which the gathering of people has assembled. For example, network bandwidth allocations may vary between a first gathering and second gathering because the type of event for the first gathering is a wedding celebration and the type of event for the second gathering is a formal meeting, and more photos and videos are expected to be captured and shared at the wedding celebration than at the formal meeting.

In another optional aspect of the present invention, the cognitive allocation of intra-channel bandwidth includes determining a specified usage pattern for a device. In response to the step of determining the specified usage pattern, channels for the device are dynamically switched to be compliant with a guaranteed bit rate. The aforementioned aspect of the present invention advantageously reduces packet error and reduces delays on the channel being used by the device.

Other embodiments of the present invention provide a computer program product and a computer system that employ respective methods analogous to the first computer-implemented method described above. The advantages of the first computer-implemented method described above also apply to the computer program product and computer system embodiments of the present invention.

In another embodiment of the present invention, a second computer-implemented method is provided. The method includes determining, by one or more processors, types of gatherings by employing training classifiers. The method further includes generating, by the one or more processors, quality of service class identifier (QCI) policies based on the types of gatherings by employing supervised learning. The QCI policies associate the types of gatherings with respective QCI values. The method further includes detecting, by the one or more processors, a group of users by detecting devices connected to one or more access points of a network. The devices are operated by the users in the group of users. The method further includes detecting, by the one or more processors, respective locations of the devices. The method further includes in response to detecting the group of users and detecting the locations of the devices, detecting, by the one or more processors, respective data access patterns of the devices. The method further includes determining, by the one or more processors, that the group of users has a total number of users that exceeds a threshold number of users. The method further includes based on (i) the detected data access patterns, (ii) the group of users having the total number of users exceeding the threshold number of users, and (iii) the QCI policies, updating, by the one or more processors, a QCI value included in the QCI values from a normal setting to a new setting to satisfy bandwidth requirements of the devices on a channel in the network. The method further includes subsequent to the step of updating the QCI value, monitoring, by the one or more processors, network traffic across the channel by employing inline stream classifiers. The method further includes based on the monitored network traffic, detecting, by the one or more processors, a change in contents of one or more dedicated traffic channels. The method further includes based on the change in the contents of the one or more dedicated traffic channels, sending, by the one or more processors, a command to an event validation manager in a 5G service orchestration to determine whether the group of users has dispersed. The method further includes based on a computation by the event validation manager of new bandwidth requirements of one or more devices connected to the one or more access points, determining, by the one or more processors, that the group of users has dispersed. The method further includes in response to the determining that the group of users has dispersed, restoring the QCI value to the normal setting.

The aforementioned embodiment providing the second computer-implemented method advantageously provides a cognitive allocation of intra-channel bandwidth by switching QCI characteristics in the service orchestration layer of 5G technology, which satisfies bandwidth requirements in a manner that is dynamic and more fine-grained, accurate, and reliable than existing network bandwidth allocation techniques.

Another embodiment of the present invention provides a computer program product that employs a method analogous to the second computer-implemented method described above. The advantages of the second computer-implemented method described above also apply to the computer program product embodiment of the present invention.

DETAILED DESCRIPTION

Overview

Figure 1:
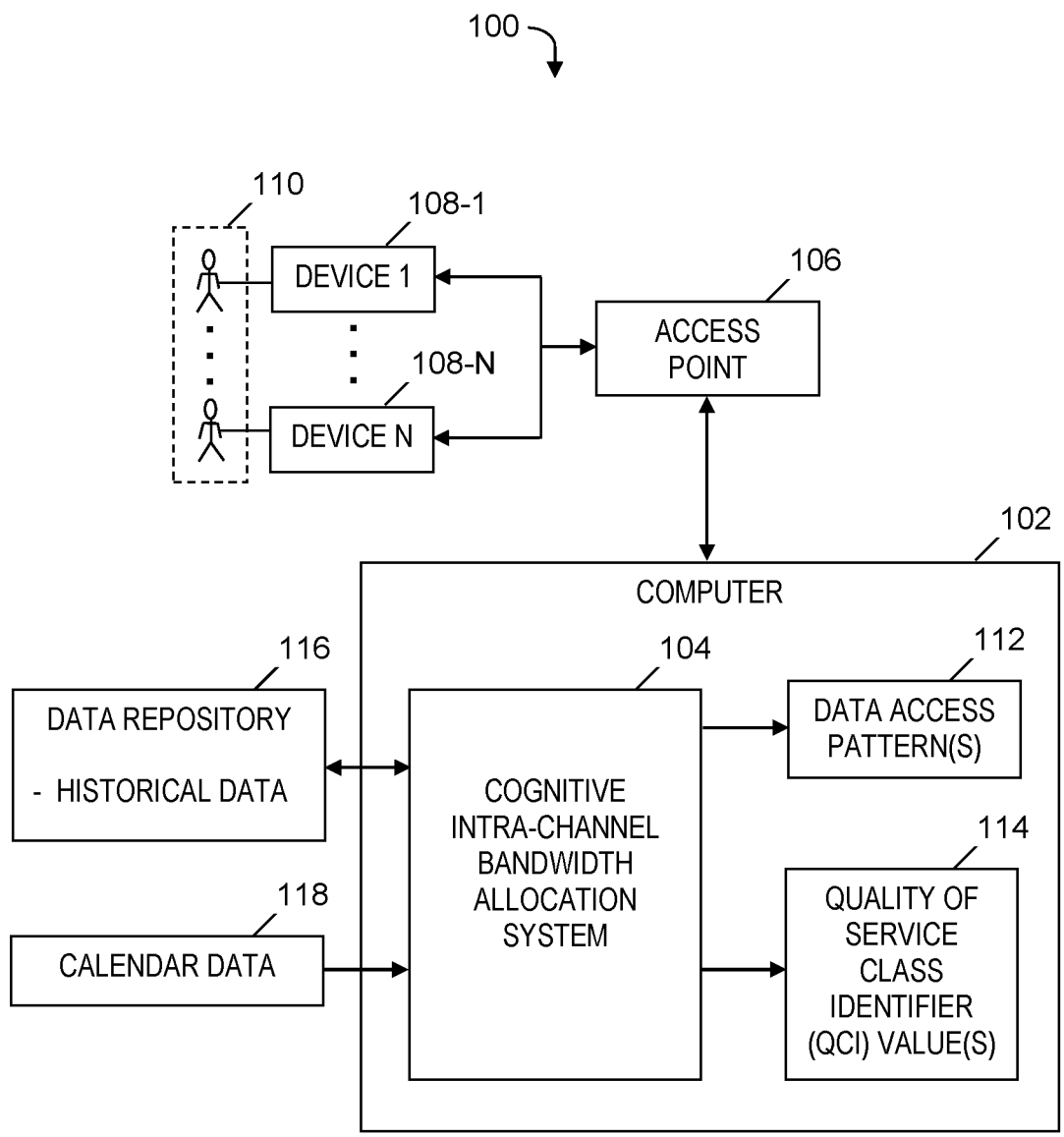
FIG. 1 is a block diagram of a system for cognitively allocating intra-channel bandwidth, in accordance with embodiments of the present invention.

Known network bandwidth allocation techniques include a dynamic reallocation of network bandwidth, but lack a mechanism that can be used in a 5G network orchestration for a reallocation of bandwidth based on a detection of an unexpected gathering of people, a determination of a type of an event for which the unexpected gathering of people is assembled, and a detection of data access patterns of the devices operated by the people included in the gathering. The unique challenges of the known solutions for network bandwidth allocation are addressed by embodiments of the present invention.

Embodiments of the present invention provide an enhanced mechanism for bandwidth allocation in a 5G telecom network by using an artificial intelligence (AI) based (i.e., cognitive) and dynamic intra-channel network bandwidth allocation.

Embodiments of the present invention detect that people have gathered in a given geographical area at a particular time, determine a type of the gathering of people, autonomously detect the network demand and data requirement for the devices used by the people in the gathering, and provide a quick and efficient control of data delivery to the devices based on the type of gathering and the detected network demand and data requirement. The detection of people who have gathered includes detecting an expected gathering of people and/or detecting an unexpected gathering of people. For example, an expected gathering of people includes users who have gathered to participate in a parade and an unexpected gathering of people includes users who moved two city blocks in a particular direction to go to a particular subway stop because another subway stop unexpectedly closed down at rush hour.

In one embodiment, the control of the data delivery in a 5G network is provided by tuning network bandwidth allocation among the channels used by the devices by dynamically switching quality of service class identifier (QCI) values based on the network demand.

Embodiments of the present invention consider software-defined networking (SDN) and network function virtualization (NFV) to adapt networking services, such as a content delivery network (CDN) and others, to variations of types of events for which users assemble to become a gathering of people. In one embodiment, a cognitive intra-channel bandwidth allocation system trains predefined models of the events based on classification techniques. The cognitive intra-channel bandwidth allocation system uses classifier objects for profile repetition and to tune QCI values. In one embodiment, historical data specifying usage patterns of devices, prioritization of devices, users' calendars, environmental characteristics, and personality insights about the users are bases for (i) determining a type of event for which users have assembled to become a gathering of people, (ii) determining bandwidth requirements for the devices operated by the users at the event, (iii) tuning QCI values, and (iv) switching between guaranteed bit rate (GBR) and non-GBR modes to satisfy an obligation to provide better quality of service (QoS) in an intelligent network.

As used herein, "cognitive" and "cognitively" are defined as pertaining to a system or process that provides AI capabilities that perform (i) supervised learning using classification algorithms and (ii) other machine learning tasks. As used herein, "cognitive" and its variants are not to be construed as being or pertaining to mental processes or concepts performed in the human mind.

System for Cognitively Allocating Intra-Channel Bandwidth

FIG. 1 is a block diagram of a system 100 for cognitively allocating intra-channel bandwidth, in accordance with embodiments of the present invention. System 100 includes a computer 102, which executes a software-based cognitive intra-channel bandwidth allocation system 104. Computer 102 is operatively coupled to an access point 106. In one embodiment, access point 106 is a 5G base station. Multiple devices 108-1, . . . , 108-N (e.g., mobile devices, wearable computers, or IoT devices) are connected to access point 106, where N is an integer greater than or equal to one. Devices 108-1, . . . , 108-N are being operated by a group of users 110. Alternatively, system 100 has one or more access points including access point 106, where computer 102 is operatively coupled to the one or more access points and where devices 108-1, . . . , 108-N are connected to respective access point(s) included in the one or more access points.

In one embodiment, cognitive intra-channel bandwidth allocation system 104 is executed by computer 102 in the service orchestration layer of a 5G network.

In one embodiment, cognitive intra-channel bandwidth allocation system 104 includes a bearer channel monitor (not shown), a 3D plotter and movement tracker (not shown), an IoT emotion tracker (not shown), a pattern to data analyzer (not shown), a priority engine (not shown), a QCI updater (not shown), and an event cycle manager (not shown).

The bearer channel monitor is a daemon process that monitors bearer channel traffic to determine data access patterns of devices 108-1, . . . , 108-N. The 3D plotter and movement tracker tracks positions and movements of devices 108-1, . . . , 108-N using 3D trilateration or another triangulation technique.

The IoT emotion tracker collects biometrics of users in the group of users 110 by receiving biometric data from IoT devices, such as activity trackers and other wireless-enabled wearable technology devices. In one embodiment, cognitive intra-channel bandwidth allocation system 104 uses a machine learning model to determine how to allocate a scarcity of intra-channel bandwidth among the users in group of users 110. The machine learning model determines an allocation of the scarce bandwidth based on the biometrics. In one embodiment, cognitive intra-channel bandwidth allocation system 104 includes a feature that allows each user in group of users 110 to opt in and opt out of the collection of the biometrics.

The pattern to data analyzer detects data access patterns of devices 108-1, . . . , 108-N, where the patterns are associated with the data collected by the bearer channel monitor. The pattern to data analyzer analyzes the data access patterns to determine a type of an event for which the group of users 110 has assembled in a geographic area and to determine an update to a QCI value. Determining the type of the event may also be based on user profiles and interests of the users.

The priority engine prioritizes the devices 108-1, . . . , 108-N or the access points of the network based on the type of the event for which the group of users 110 has assembled. In one embodiment, the allocation of network bandwidth is based on the prioritization of the devices.

The QCI updater updates the QCI value based on (i) the group of users 110 being a gathering of people in a specified geographic area at a given time, (ii) the data access patterns, and (iii) the type of the event. The gathering of people can be an expected gathering or an unexpected gathering.

In one embodiment, cognitive intra-channel bandwidth allocation system 104 determines that group of users 110 is an unexpected gathering of people for a specified geographic area and a specified time based on the total number of users in the group of users 110 exceeding, by a threshold amount, an expected number of people for the specified geographic area and the specified time. The expected number of people is derived from historical data included in data repository 116. For example, the expected number of people for the specified geographic area and the specified time is an average number people that are in the geographic area at times that match the specified time, where the average number of people in the geographic area at the aforementioned times and an associated standard deviation are determined from historical data retrieved from data repository 116 specifying the number of devices connected to the access points in the specified geographic area at different times. In this example, the total number of users in the group of users 110 exceeds the expected number of people by the threshold amount because the total number of users exceeds the average number of people in the geographic area by more than one standard deviation.

The event cycle manager determines whether the gathering of people has dispersed (i.e., the number of users remaining in the specified geographic area at a subsequent time does not exceed the expected number of people by the threshold amount). If the event cycle manager determines that the gathering of people has dispersed, then the event cycle manager restores the QCI value to its normal setting (i.e., the initial setting that had previously been updated to a new setting).

Cognitive intra-channel bandwidth allocation system 104 detects connections that devices 108-1, . . . , 108-N have with access point 106. The 3D plotter and movement tracker in cognitive intra-channel bandwidth allocation system 104 uses 3D trilateration or another geo-location determination technique to determine the geographic locations of devices 108-1, . . . , 108-N. Using the detected connections and the locations, cognitive intra-channel bandwidth allocation system 104 detects the group of users 110 of devices 108-1, . . . , 108-N. Cognitive intra-channel bandwidth allocation system 104 determines that a total number of users in the group of users 110 exceeds a predetermined threshold number of users, thereby indicating that the group of users 110 is a gathering of people of sufficient size to warrant a cognitive allocation of bandwidth.

The bearer channel monitor in cognitive intra-channel bandwidth allocation system 104 detects data access pattern(s) 112 for devices 108-1, . . . , 108-N being operated by the group of users 110 who are included in the detected group of users 110. Using the detected data access pattern(s) 112, cognitive intra-channel bandwidth allocation system 104 determines bandwidth requirements of devices 108-1, . . . , 108-N and updates QCI value(s) 114 to satisfy the bandwidth requirements.

In one embodiment, cognitive intra-channel bandwidth allocation system 104 receives historical data from data repository 116, where the historical data specifies data access by the group of users 110 to determine the bandwidth requirements. In one embodiment, cognitive intra-channel bandwidth allocation system 104 receives calendar data 118 of the group of users 110 to determine the type of the gathering of the group of users 110 and the timeline of the gathering to determine the bandwidth requirements. For example, calendar data 118 indicates that a parade had been scheduled to occur along a route in a city during a specified time period, thereby indicating that group of users 110 are likely gathered to participate in or watch the parade. In one embodiment, cognitive intra-channel bandwidth allocation system 104 includes a feature that allows each user in group of users 110 to opt in and opt out of a collection of calendar data 118.

In one embodiment, cognitive intra-channel bandwidth allocation system 104 operates in the service orchestration layer of a 5G network along with co-existing smart bearer channel monitoring tools that are used with existing 4G networks to identify insights from mobile devices and IoT enabled devices used by the people in the group of users 110, where the devices are eNodeB connected. In one embodiment, cognitive intra-channel bandwidth allocation system 104 detects the people gathering in the group of users 110 by detecting a user login pattern to a particular eNodeB. After cognitive intra-channel bandwidth allocation system 104 identifies the gathering of people, cognitive intra-channel bandwidth allocation system 104 identifies a type of the gathering based on traffic generated by the devices 108-1, . . . , 108-N used by the people in the gathering via a triggering of QCI classifications and subsequent inferences by a machine learning system included in cognitive intra-channel bandwidth allocation system 104. After the QCI classification generates the insights, cognitive intra-channel bandwidth allocation system 104 dynamically switches the QCI characteristics based on the network demand of the devices 108-1, . . . , 108-N.

In one embodiment, cognitive intra-channel bandwidth allocation system 104 considers software-defined networking (SDN) and network function virtualization (NFV) to adapt the networking services, such as content delivery network (CDN), but also others to the variations of the types of events for the group functionality. In one embodiment, cognitive intra-channel bandwidth allocation system 104 (see FIG. 1) uses CDN and other peripheral integrators to collect situational insights and provide inline media manipulation. In one embodiment, cognitive intra-channel bandwidth allocation system 104 (see FIG. 1) uses CDN to provide the capability of inline media matching services that are used for event identification. The NFV plane of a 5G telecom network provides ground level data traffic and insights that are integrated in event and priority management at the 5G service orchestration. The NFV includes a set of functions that provides out-of-bound intercommunication from UEs and the associated eNodeB, and is used for control information exchange across the network. In one embodiment, the predefined models of the events are trained to cognitive intra-channel bandwidth allocation system 104 based on already available classification techniques. Cognitive intra-channel bandwidth allocation system 104 uses the classifier objects for profile repetition by which QCI tuning is performed. In one embodiment, cognitive intra-channel bandwidth allocation system 104 considers historical data of user behavior, priorities based on usage patterns of the devices 108-1, . . . , 108-N, calendar data 118, environmental characteristics, and personality insights of the people in the group of users 110 to determine the type of the gathering of people and the network bandwidth requirements, and to tune the QCI value(s) 114, together with switching between guaranteed bit rate (GBR) and non-GBR modes based on an obligation to provide better quality of service (QoS) in intelligent networks.

Figure 2A:
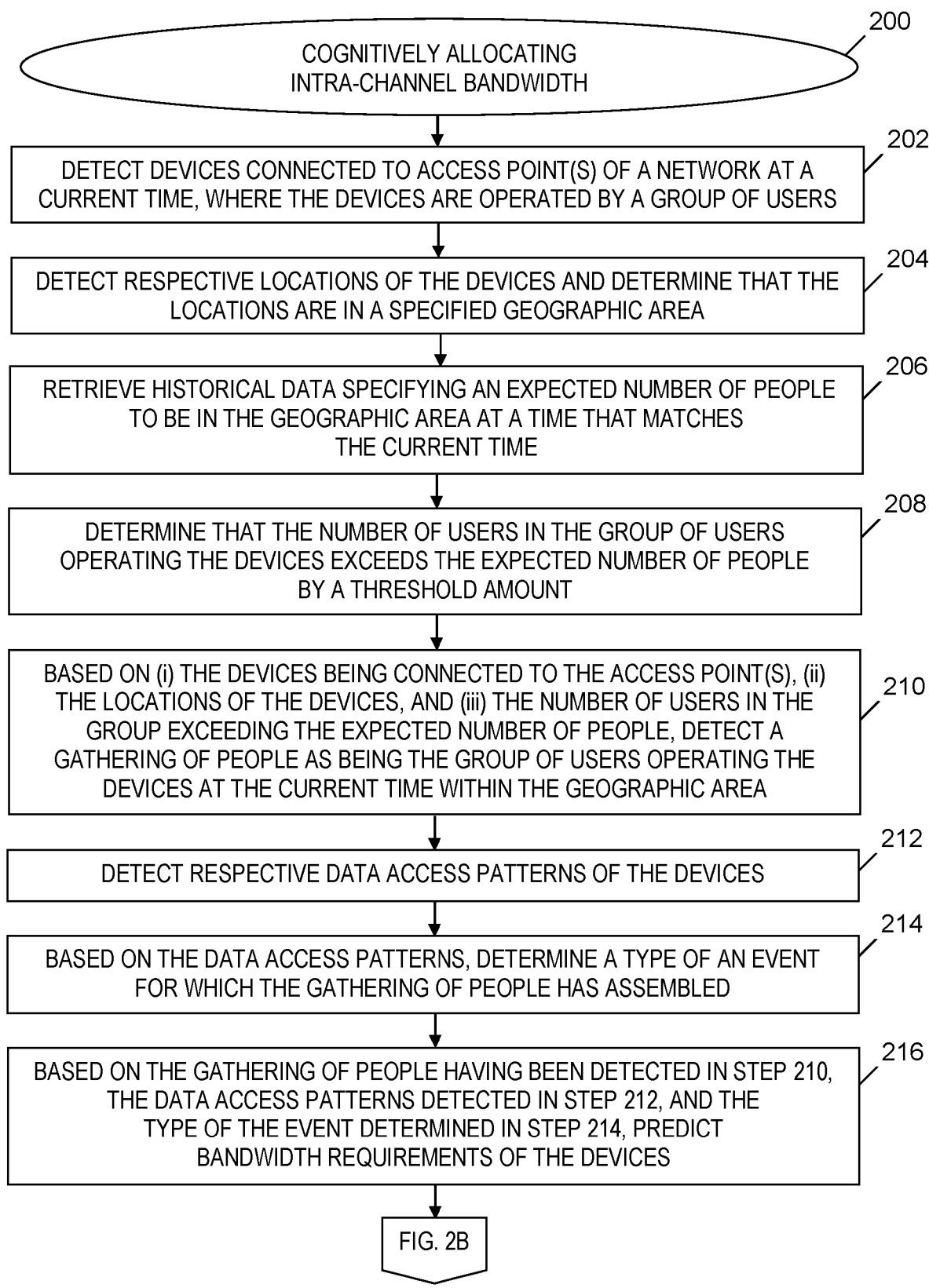
FIGS. 2A-2B depict a flowchart of a process of cognitively allocating intra-channel bandwidth, where the process is implemented in the system of FIG. 1, in accordance with embodiments of the present invention.
Figure 2B:
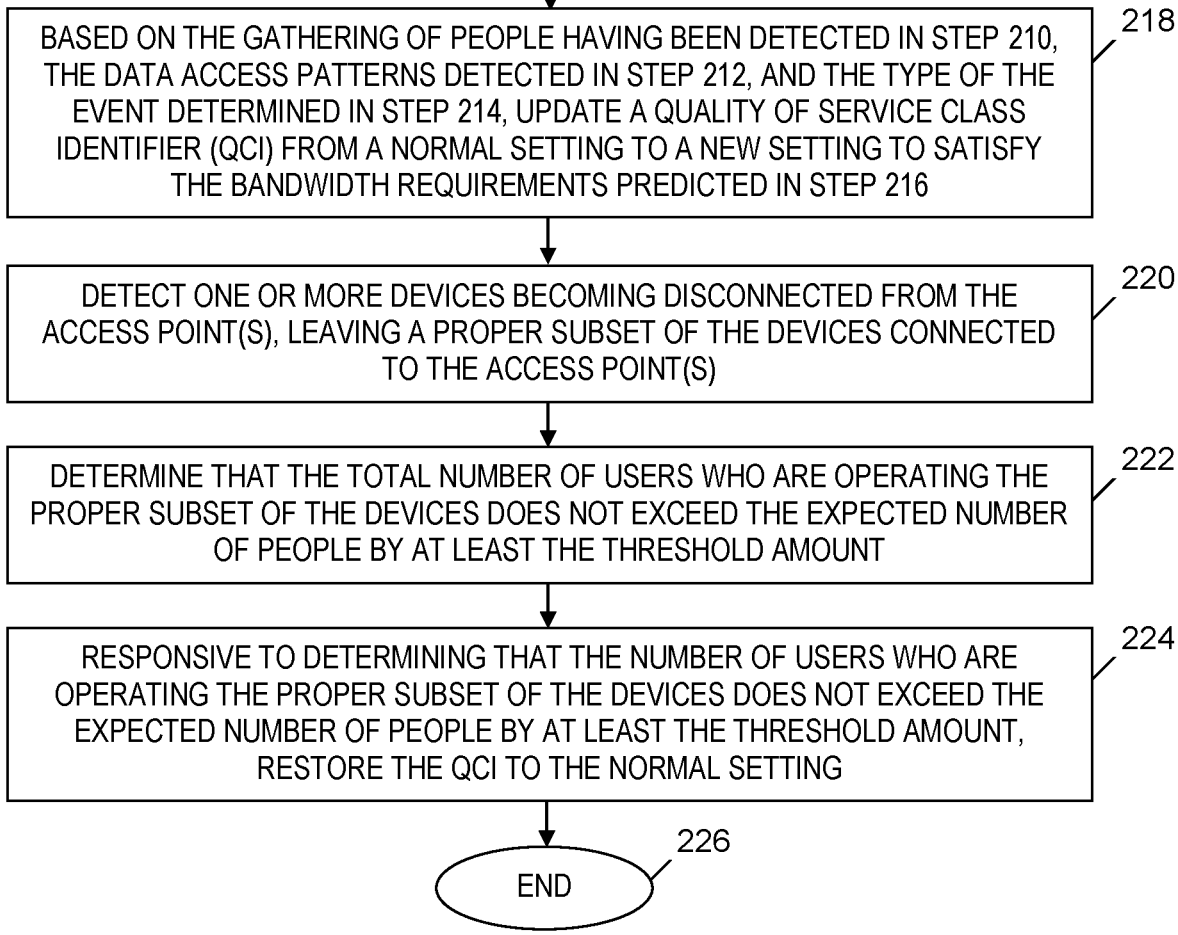
Figure 3:
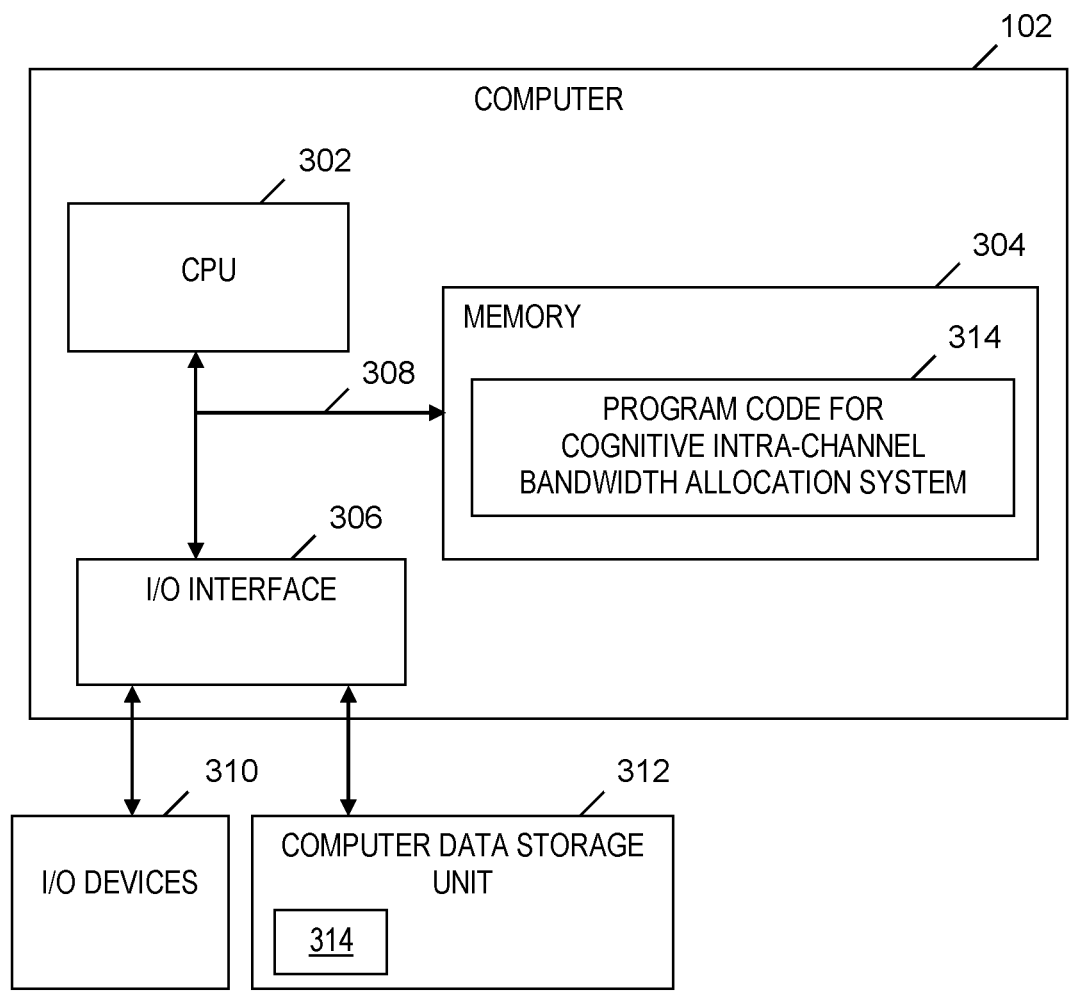
FIG. 3 is a block diagram of a computer included in the system of FIG. 1 and that implements the process of FIGS. 2A-2B, in accordance with embodiments of the present invention.

The functionality of the components shown in FIG. 1 is described in more detail in the discussion of FIGS. 2A-2B and FIG. 3 presented below.

Process for Cognitively Allocating Intra-Channel Bandwidth

FIGS. 2A-2B depicts a flowchart of a process of cognitively allocating intra-channel bandwidth, where the process is implemented in the system of FIG. 1, in accordance with embodiments of the present invention. The process of FIGS. 2A-2B starts at step 200. In step 202 in FIG. 2A, cognitive intra-channel bandwidth allocation system 104 (see FIG. 1) detects devices 108-1, . . . , 108-N (see FIG. 1) connected to one or more access points of a network at a current time, where the one or more access points include access point 106 (see FIG. 1). Devices 108-1, . . . , 108-N (see FIG. 1) are operated by group of users 110 (see FIG. 1). In one embodiment, the network is a 5G network. In one embodiment, cognitive intra-channel bandwidth allocation system 104 (see FIG. 1) detects devices 108-1, . . . , 108-N (see FIG. 1) through existing interfaces that integrate devices 108-1, . . . , 108-N (see FIG. 1) with access point 106 (see FIG. 1).

For example, operating system integrators software or an externally installable programming interface that collects information from Global Positing System (GPS) interconnects obtains user details such as location, user profiles, a list of active applications, a type of gathering based on interconnects to calendar data 118 (see FIG. 1), user personality maps, and sends the user details via in-bound or out-of-bound application programming interfaces (APIs) to service the orchestration layer of a 5G telecom network. For the in-bound API interconnection, the dedicated control channel (DCCH) from user equipment (UE) (i.e., one of the devices 108-1, . . . , 108-N in FIG. 1) communicates with radio link control (RLC), which further translates the stream to the service orchestration using function specific dedicated travel channel (DTCH). A daemon process (i.e., bearer channel monitor) included in cognitive intra-channel bandwidth allocation system 104 (see FIG. 1) determines bearer channel usage by monitoring the type of data streams transferred and uses DTCH based on location. The cognitive intra-channel bandwidth allocation system 104 (see FIG. 1) construct a location-to-MediaType map using location tracing of the UE and the transmission capture of the bearer channel of the UE.

In step 204, cognitive intra-channel bandwidth allocation system 104 (see FIG. 1) detects respective locations of devices 108-1, . . . , 108-N (see FIG. 1) and determines that the locations are in a specified geographic area. In one embodiment, the 3D plotter and movement tracker in cognitive intra-channel bandwidth allocation system 104 (see FIG. 1) detects the locations of devices 108-1, . . . , 108-N (see FIG. 1) in step 204.

In step 206, cognitive intra-channel bandwidth allocation system 104 (see FIG. 1) retrieves historical data specifying an expected number of people to be in the aforementioned specified geographic area that includes the locations detected in step 204, at a time that matches the current time.

In step 208, cognitive intra-channel bandwidth allocation system 104 (see FIG. 1) determines that the total number of users in the group of users 110 (see FIG. 1) who are operating devices 108-1, . . . , 108-N (see FIG. 1) exceeds the expected number of people by at least a predetermined threshold amount, where the expected number of people is specified by the historical data retrieved in step 206.

In step 210, based on (i) the devices 108-1, . . . , 108-N (see FIG. 1) being connected to the one or more access points as detected in step 202, (ii) the locations detected in step 204, and (iii) the total number of users in the group of users 110 (see FIG. 1) exceeds the expected number of people as determined in step 208, cognitive intra-channel bandwidth allocation system 104 (see FIG. 1) detects a gathering of people as being the group of users 110 (see FIG. 1) operating devices 108-1, ..., 108-N (see FIG. 1) at the current time within the geographic area.

In step 212, in response to detecting the devices 108-1, ..., 108-N (see FIG. 1) connected to the one or more access points in step 202 and determining that the number of users in the group of users 110 (see FIG. 1) exceeds the expected number of people specified by the historical data retrieved in step 206, cognitive intra-channel bandwidth allocation system 104 (see FIG. 1) detects respective data access patterns of the devices 108-1, ..., 108-N (see FIG. 1). In one embodiment, the bearer channel monitor provides data specifying bearer channel traffic, which is a basis for detecting the data access patterns in step 212. In one embodiment, the pattern to data analyzer detects the data access patterns in step 212.

In step 214, based on the data access patterns detected in step 212, cognitive intra-channel bandwidth allocation system 104 (see FIG. 1) determines a type of an event for which the gathering of people has assembled. In one embodiment, the pattern to data analyzer in cognitive intra-channel bandwidth allocation system 104 (see FIG. 1) determines the type of the event in step 214.

In one embodiment, cognitive intra-channel bandwidth allocation system 104 (see FIG. 1) uses inline data stream classifiers to capture the data stream flowing from DTCH, read metadata objects, and send across the DTCH over Evolved Packet System (EPS) bearer (i.e., a logical connection from the UE that has been assigned a quality of service for data transmission). Based on statistics derived from cognitive intra-channel bandwidth allocation system 104 (see FIG. 1) monitoring the EPS bearer, cognitive intra-channel bandwidth allocation system 104 (see FIG. 1) interprets the object types sent and received over the EPS bearer and logical channels and maps the connection from the UE with location and other situational context. Cognitive intra-channel bandwidth allocation system 104 (see FIG. 1) infers the type of contents to be exchanged over DTCH for a given location, thereby identifying a likely type of event based on the channel usage.

In step 216, based on the gathering of people having been detected in step 210, the data access patterns detected in step 212, and the type of the event determined in step 214, cognitive intra-channel bandwidth allocation system 104 (see FIG. 1) predicts bandwidth requirements of the devices 108-1, ..., 108-N (see FIG. 1) and determines the updates to the QCI value(s) 114 (see FIG. 1) that are necessary to satisfy the predicted bandwidth requirements. In one embodiment, step 216 includes cognitive intra-channel bandwidth allocation system 104 (see FIG. 1) determining the updates to the QCI value(s) 114 (see FIG. 1) that are necessary to dynamically switch channels to be GBR compliant.

In one embodiment, the prediction of the bandwidth requirements and the determination of the updates to the QCI value(s) 114 (see FIG. 1) in step 216 are further based on (i) the prioritization of devices 108-1, ..., 108-N (see FIG. 1) provided by the priority engine and (ii) the biometric data provided by the IoT emotion tracker. In one embodiment, cognitive intra-channel bandwidth allocation system 104 (see FIG. 1) analyzes bandwidth requirements of bearer channels, prioritizes the devices 108-1, ..., 108-N (see FIG. 1) and selects a QCI policy based on the bandwidth requirements and prioritized devices. In one embodiment, cognitive intra-channel bandwidth allocation system 104 (see FIG. 1) collects the bandwidth requirements of the bearer channels from a transmission flow monitor and other device integration platforms that provide details for the bearer channel data flow per UE (i.e., device) connected to eNodeB. In one embodiment, cognitive intra-channel bandwidth allocation system 104 (see FIG. 1) uses interconnected APIs to capture a transmission over an Si bearer to a 5G infrastructure management plane, thereby identifying bandwidth requirements. In one embodiment, cognitive intra-channel bandwidth allocation system 104 (see FIG. 1) prioritizes the devices 108-1, ... 108-N based on the type of the event and input/output (I/O) traffic over the EPS bearer by reading the metadata mappers at the infrastructure management plane. The 5G infrastructure and physical interface layer includes monitoring tools that provides monitoring capability for the media metadata over the DTCH. Cognitive intra-channel bandwidth allocation system 104 (see FIG. 1) maps the metadata to the event type and determines a prioritization of events based on the map. The assigned priority of an event determines the I/O flow during network congestion and the precedence events that can continue to operate during network congestion. In one embodiment, cognitive intra-channel bandwidth allocation system 104 (see FIG. 1) identifies a QCI classification based on the event type and event prioritization. In one embodiment, cognitive intra-channel bandwidth allocation system 104 (see FIG. 1) selects the QCI classification like GBR or non-GBR for a selected DTCH and EPS bearer.

In step 218 in FIG. 2B, based on the gathering of people having been detected in step 210, the data access patterns detected in step 212, and the type of the event determined in determined in step 214, cognitive intra-channel bandwidth allocation system 104 (see FIG. 1) updates a QCI value from a normal setting to a new setting to satisfy the bandwidth requirements predicted in step 216. The QCI value being updated in step 214 is included in QCI value(s) 114 (see FIG. 1). In one embodiment, the QCI updater included in cognitive intra-channel bandwidth allocation system 104 (see FIG. 1) updates the QCI value in step 214.

In one embodiment, cognitive intra-channel bandwidth allocation system 104 (see FIG. 1) identifies QCI levels of current logical channels and instructs UEs in a geographic area to share the QCI classification value using common control channel (CCCH). DCCH can be used as an alternative to CCCH. In one embodiment, in response to the command to share the QCI classification value, the UE sends the QCI classification value for the requested bearer channel using DCCH. In one embodiment, cognitive intra-channel bandwidth allocation system 104 (see FIG. 1) assigns the updated QCI value along with GBR and non-GBR compliance values to the logical channel at the physical network function manager in a 5G architecture. Cognitive intra-channel bandwidth allocation system 104 (see FIG. 1) uses a common control channel (CCCH) for the devices 108-1, ..., 108-N (see FIG. 1) in the geographic area to inform each device about the assignment of the updated QCI value and the GBR and non-GBR compliance values. Receiving the updated QCI value changes the nature of the bearer traffic performance, thereby allowing information to be transferred using situational requirements.

In step 220, cognitive intra-channel bandwidth allocation system 104 (see FIG. 1) detects one or more devices included in devices 108-1, ..., 108-N (see FIG. 1) becoming disconnected from the one or more access points, which leaves a proper subset of devices 108-1, ..., 108-N (see FIG. 1) connected to the one or more access points. In one embodiment, the event cycle manager included in cognitive intra-channel bandwidth allocation system 104 (see FIG. 1) performs step 220.

In step 222, cognitive intra-channel bandwidth allocation system 104 (see FIG. 1) determines that the total number of users who are operating the proper subset of the devices does not exceed the expected number of people by at least the threshold amount. In one embodiment, the event cycle manager included in cognitive intra-channel bandwidth allocation system 104 (see FIG. 1) performs step 222.

In step 224, responsive to determining that the number of users who are operating the proper subset of devices 108-1, . . . , 108-N does not exceed the expected number of people by at least the threshold amount, cognitive intra-channel bandwidth allocation system 104 (see FIG. 1) restores the QCI value to the normal setting, where the QCI value had been updated in step 218.

In one embodiment, the event cycle manager and the bearer channel monitor in cognitive intra-channel bandwidth allocation system 104 (see FIG. 1) continuously monitors for input/output traffic across a channel. In response to detecting an update of a QCI value in step 218, inline stream classifiers continue to monitor upcoming traffic. In response to cognitive intra-channel bandwidth allocation system 104 (see FIG. 1) recognizing that the EPS or DTCH contents have changed, cognitive intra-channel bandwidth allocation system 104 (see FIG. 1) sends a command to an event validation manager in a 5G service orchestration. The event validation manager recomputes the event artifacts and checks for event validity and bandwidth requirement. If the gathering of people that assembled for the event disperses, then cognitive intra-channel bandwidth allocation system 104 (see FIG. 1) restores the QCI value to the normal (i.e., original) setting by requesting the corresponding device using CCCH and dedicated control channel (DCCH) message communication.

Following step 224, the process of FIGS. 2A-2B ends at step 226.

In another embodiment, alternatives to the above-described steps 212, 214, and 216 include: (1) using historical data retrieved from data repository 116 (see FIG. 1), cognitive intra-channel bandwidth allocation system 104 (see FIG. 1) determines historical data access patterns of devices 108-1, . . . , 108-N (see FIG. 1); (2) using calendar data 118 (see FIG. 1) generated by calendar apps utilized by the group of users 110 (see FIG. 1), cognitive intra-channel bandwidth allocation system 104 (see FIG. 1) determines (i) the type of the event for which the gathering of people has assembled and (ii) a timeline during which the gathering of people will remain assembled; and (3) based on the historical data access patterns of the devices 108-1, . . . , 108-N (see FIG. 1), the type of the event, and the timeline, cognitive intra-channel bandwidth allocation system 104 (see FIG. 1) determines the bandwidth requirements of the devices. In one embodiment, cognitive intra-channel bandwidth allocation system 104 (see FIG. 1) collects the aforementioned historical data at the service orchestration layer of a 5G telecom network and refines the historical data to determine time-based context analysis. After determining the channel usage, cognitive intra-channel bandwidth allocation system 104 (see FIG. 1) introduces timeline constraints to determine the class of traffic in a selected boundary area (i.e., geographic area). The boundary area can be static or dynamic based on the type of the event and contains a stream-type to timeline map. Cognitive intra-channel bandwidth allocation system 104 (see FIG. 1) can use a machine learning mechanism to learn from the historical data at the 5G service orchestration layer together with additional awareness of user calendars and gathering UE data transmission timelines. In one embodiment, cognitive intra-channel bandwidth allocation system 104 (see FIG. 1) maps the event to the user calendar and predicts a future bandwidth requirement based on the importance of the data transmitted over the EPS bearer. In one embodiment, cognitive intra-channel bandwidth allocation system 104 provides options for the users in group of users 110 (see FIG. 1) to opt in and opt out of a collection of calendar data 118 (see FIG. 1) from devices 108-1, . . . , 108-N (see FIG. 1).

In one embodiment, cognitive intra-channel bandwidth allocation system 104 (see FIG. 1) prioritizes one or more of devices 108-1, . . . , 108-N (see FIG. 1) based on historical data access patterns of the devices 108-1, . . . , 108-N (see FIG. 1) and further based on the type of the event determined in step 214. Based on the prioritized device(s) included in devices 108-1, . . . , 108-N (see FIG. 1), cognitive intra-channel bandwidth allocation system 104 (see FIG. 1) allocates bandwidth to the prioritized device(s) to satisfy the bandwidth requirements of the device(s).

In one embodiment, cognitive intra-channel bandwidth allocation system 104 (see FIG. 1) determines a specified usage pattern for device 108-1 (see FIG. 1). In response to determining the specified usage pattern, cognitive intra-channel bandwidth allocation system 104 (see FIG. 1) dynamically switches channels for device 108-1 (see FIG. 1) to be compliant with a guaranteed bit rate, which reduces packet error and reduces delays in the channel.

In one embodiment, training classifiers included in cognitive intra-channel bandwidth allocation system 104 (see FIG. 1) obtain the frequently observed types of gatherings (e.g., official meetings, weddings, etc.) and includes the trained QCI policies for these types of gatherings (i.e., trained events). Cognitive intra-channel bandwidth allocation system 104 (see FIG. 1) uses the training classifiers to create a profiling and respective signatures of the events. Cognitive intra-channel bandwidth allocation system 104 (see FIG. 1) assigns predefined QCI values in response to detecting a signature of one of the events by supervised learning.

Computer System

FIG. 3 is a block diagram of a computer included in the system of FIG. 1 and that implements the process of FIGS. 2A-2B, in accordance with embodiments of the present invention. Computer 102 is a computer system that generally includes a central processing unit (CPU) 302, a memory 304, an input/output (I/O) interface 306, and a bus 308. Further, computer 102 is coupled to I/O devices 310 and a computer data storage unit 312. CPU 302 performs computation and control functions of computer 102, including executing instructions included in program code 314 for a system that includes cognitive intra-channel bandwidth allocation system 104 (see FIG. 1) to perform a method of cognitively allocating intra-channel bandwidth, where the instructions are executed by CPU 302 via memory 304. CPU 302 may include a single processing unit or be distributed across one or more processing units in one or more locations (e.g., on a client and server).

Memory 304 includes a known computer readable storage medium, which is described below. In one embodiment, cache memory elements of memory 304 provide temporary storage of at least some program code (e.g., program code 314) in order to reduce the number of times code must be retrieved from bulk storage while instructions of the program code are executed. Moreover, similar to CPU 302, memory 304 may reside at a single physical location, including one or more types of data storage, or be distributed across a plurality of physical systems in various forms.

Further, memory 304 can include data distributed across, for example, a local area network (LAN) or a wide area network (WAN).

I/O interface 306 includes any system for exchanging information to or from an external source. I/O devices 310 include any known type of external device, including a display, keyboard, etc. Bus 308 provides a communication link between each of the components in computer 102, and may include any type of transmission link, including electrical, optical, wireless, etc.

I/O interface 306 also allows computer 102 to store information (e.g., data or program instructions such as program code 314) on and retrieve the information from computer data storage unit 312 or another computer data storage unit (not shown). Computer data storage unit 312 includes a known computer readable storage medium, which is described below. In one embodiment, computer data storage unit 312 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 304 and/or storage unit 312 may store computer program code 314 that includes instructions that are executed by CPU 302 via memory 304 to cognitively allocate intra-channel bandwidth. Although FIG. 3 depicts memory 304 as including program code, the present invention contemplates embodiments in which memory 304 does not include all of code 314 simultaneously, but instead at one time includes only a portion of code 314.

Further, memory 304 may include an operating system (not shown) and may include other systems not shown in FIG. 3.

In one embodiment, computer data storage unit 312 includes data repository 112 (see FIG. 1) and calendar data 118 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to cognitively allocating intra-channel bandwidth. Thus, an embodiment of the present invention discloses a process for supporting computer infrastructure, where the process includes providing at least one support service for at least one of integrating, hosting, maintaining and deploying computer-readable code (e.g., program code 314) in a computer system (e.g., computer 102) including one or more processors (e.g., CPU 302), wherein the processor(s) carry out instructions contained in the code causing the computer system to cognitively allocate intra-channel bandwidth. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of cognitively allocating intra-channel bandwidth.

While it is understood that program code 314 for cognitively allocating intra-channel bandwidth may be deployed by manually loading directly in client, server and proxy computers (not shown) via loading a computer-readable storage medium (e.g., computer data storage unit 312), program code 314 may also be automatically or semi-automatically deployed into computer 102 by sending program code 314 to a central server or a group of central servers. Program code 314 is then downloaded into client computers (e.g., computer 102) that will execute program code 314. Alternatively, program code 314 is sent directly to the client computer via e-mail. Program code 314 is then either detached to a directory on the client computer or loaded into a directory on the client computer by a button on the e-mail that executes a program that detaches program code 314 into a directory. Another alternative is to send program code 314 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 314 is transmitted to the proxy server and then it is stored on the proxy server.

Another embodiment of the invention provides a method that performs the process steps on a subscription, advertising and/or fee basis. That is, a service provider can offer to create, maintain, support, etc. a process of cognitively allocating intra-channel bandwidth. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 304 and computer data storage unit 312) having computer readable program instructions 314 thereon for causing a processor (e.g., CPU 302) to carry out aspects of the present invention.

The computer readable storage medium can be a tangible device that can retain and store instructions (e.g., program code 314) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 314) described herein can be downloaded to respective computing/processing devices (e.g., computer 102) from a computer readable storage medium or to an external computer or external storage device (e.g., computer data storage unit 312) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 314) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B) and/or block diagrams (e.g., FIG. 1 and FIG. 3) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 314).

These computer readable program instructions may be provided to a processor (e.g., CPU 302) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 314) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method comprising the steps of:
    detecting, by one or more processors, devices connected to one or more access points of a network;
    detecting, by the one or more processors, respective locations of the devices;
    based on (i) the devices being connected to the one or more access points and (ii) the locations of the devices, detecting, by the one or more processors, a gathering of people as a group of users who are operating the detected devices at a current time within a geographical area that includes the locations of the devices;
    detecting, by the one or more processors, respective data access patterns of the devices;
    based on the detected data access patterns and the gathering of people being detected, updating, by the one or more processors, a quality of service class identifier (QCI) from a normal setting to a new setting to satisfy bandwidth requirements of the devices;

retrieving, by the one or more processors, historical data specifying an expected number of people to be in the geographic area at a time that matches the current time;

determining, by the one or more processors, that the group of users has a first total number of users that exceeds the expected number of people by at least a threshold amount, wherein the step of detecting the gathering of people is further based on the group of users having the first total number of users that exceeds the expected number of people by at least the threshold amount;

subsequent to the step of updating the QCI, detecting, by the one or more processors, one or more devices included in the devices becoming disconnected from the one or more access points, leaving a proper subset of the devices connected to the one or more access points, the proper subset of the devices being operated by a proper subset of the users;

determining, by the one or more processors, that the proper subset of the users has a second total number of users that does not exceed the expected number people by at least the threshold amount; and in response to determining that the proper subset of the users has the second total number of users that does not exceed the expected number of people by at least the threshold amount, restoring, by the one or more processors, the QCI to the normal setting.

2. The method of claim 1, further comprising the step of based on the data access patterns, determining, by the one or more processors, a type of an event for which the gathering of people has assembled, wherein the step of updating the QCI is further based on the type of the event.

3. The method of claim 2, further comprising the step of based on the type of the event, the gathering of people being detected, and the data access patterns of the devices, predicting, by the one or more processors, the bandwidth requirements of the devices, wherein the step of updating the QCI is performed to satisfy the predicted bandwidth requirements in response to the step of predicting the bandwidth requirements of the devices.

4. The method of claim 1, further comprising the steps of:
using other historical data, determining, by the one or more processors, historical data access patterns of the devices;
using calendars of the users, determining, by the one or more processors, a type of an event for which the gathering of people has assembled and determining, by the one or more processors, a timeline of the gathering of people; and
based on the historical data access patterns of the devices, the type of the event, and the timeline of the gathering, determining, by the one or more processors, the bandwidth requirements of the devices.

5. The method of claim 4, further comprising the steps of:
based on the historical data access patterns of the devices and the type of the event, prioritizing, by the one or more processors, the devices; and
based on the prioritized devices, allocating bandwidth to the devices to satisfy the bandwidth requirements of the devices.

6. The method of claim 1, further comprising the steps of:
determining, by the one or more processors, a specified usage pattern for a device included in the devices; and
in response to the step of determining the specified usage pattern, dynamically switching, by the one or more processors, channels for the device to be compliant with a guaranteed bit rate, which reduces packet error.

7. The method of claim 1, further comprising the step of:
providing at least one support service for at least one of creating, integrating, hosting, maintaining, and deploying computer readable program code in the computer, the program code being executed by a processor of the computer to implement detecting the devices, detecting the respective locations of the devices, detecting the gathering of people, detecting the respective data access patterns of the devices, updating the QCI, retrieving the historical data, determining that the group of users has the first total number of users that exceeds the expected number of people by at least the threshold amount, detecting the one or more devices included in the devices becoming disconnected from the one or more access points, determining that the proper subset of the users has the second total number of users that does not exceed the expected number people by at least the threshold amount, and restoring the QCI to the normal setting.

8. A computer program product comprising:
a computer readable storage medium having computer readable program code stored on the computer readable storage medium, the computer readable program code being executed by a central processing unit (CPU) of a computer system to cause the computer system to perform a method comprising the steps of:
the computer system detecting devices connected to one or more access points of a network;
the computer system detecting respective locations of the devices;
based on (i) the devices being connected to the one or more access points and (ii) the locations of the devices, the computer system detecting a gathering of people as a group of users who are operating the detected devices at a current time within a geographical area that includes the locations of the devices;
the computer system detecting respective data access patterns of the devices;
based on the detected data access patterns and the gathering of people being detected, the computer system updating a quality of service class identifier (QCI) from a normal setting to a new setting to satisfy bandwidth requirements of the devices;
the computer system retrieving historical data specifying an expected number of people to be in the geographic area at a time that matches the current time;
the computer system determining that the group of users has a first total number of users that exceeds the expected number of people by at least a threshold amount, wherein the step of detecting the gathering of people is further based on the group of users having the first total number of users that exceeds the expected number of people by at least the threshold amount;
subsequent to the step of updating the QCI, the computer system detecting one or more devices included in the devices becoming disconnected from the one or more access points, leaving a proper subset of the devices connected to the one or more access points, the proper subset of the devices being operated by a proper subset of the users;
the computer system determining that the proper subset of the users has a second total number of users that does not exceed the expected number people by at least the threshold amount; and
in response to determining that the proper subset of the users has the second total number of users that does not exceed the expected number of people by at least the threshold amount, the computer system restoring the QCI to the normal setting.

9. The computer program product of claim 8, wherein the method further comprises the step of based on the data access patterns, the computer system determining a type of an event for which the gathering of people has assembled, wherein the step of updating the QCI is further based on the type of the event.

10. The computer program product of claim 9, wherein the method further comprises the step of based on the type of the event, the gathering of people being detected, and the data access patterns of the devices, the computer system predicting the bandwidth requirements of the devices, wherein the step of updating the QCI is performed to satisfy the predicted bandwidth requirements in response to the step of predicting the bandwidth requirements of the devices.

11. The computer program product of claim 8, wherein the method further comprises the steps of:
using other historical data, the computer system determining historical data access patterns of the devices;
using calendars of the users, the computer system determining a type of an event for which the gathering of people has assembled and determining a timeline of the gathering of people; and
based on the historical data access patterns of the devices, the type of the event, and the timeline of the gathering, the computer system determining the bandwidth requirements of the devices.

12. The computer program product of claim 11, wherein the method further comprises the steps of:
based on the historical data access patterns of the devices and the type of the event, the computer system prioritizing the devices; and
based on the prioritized devices, the computer system allocating bandwidth to the devices to satisfy the bandwidth requirements of the devices.

13. The computer program product of claim 8, wherein the method further comprises the steps of:
the computer system determining a specified usage pattern for a device included in the devices; and
in response to the step of determining the specified usage pattern, the computer system dynamically switching channels for the device to be compliant with a guaranteed bit rate, which reduces packet error.

14. A computer system comprising:
a central processing unit (CPU);
a memory coupled to the CPU; and
a computer readable storage medium coupled to the CPU, the computer readable storage medium containing instructions that are executed by the CPU via the memory to implement a method comprising the steps of:
the computer system detecting devices connected to one or more access points of a network;
the computer system detecting respective locations of the devices;
based on (i) the devices being connected to the one or more access points and (ii) the locations of the devices, the computer system detecting a gathering of people as a group of users who are operating the detected devices at a current time within a geographical area that includes the locations of the devices;
the computer system detecting respective data access patterns of the devices;
based on the detected data access patterns and the gathering of people being detected, the computer system updating a quality of service class identifier (QCI) from a normal setting to a new setting to satisfy bandwidth requirements of the devices;
the computer system retrieving historical data specifying an expected number of people to be in the geographic area at a time that matches the current time;
the computer system determining that the group of users has a first total number of users that exceeds the expected number of people by at least a threshold amount, wherein the step of detecting the gathering of people is further based on the group of users having the first total number of users that exceeds the expected number of people by at least the threshold amount;
subsequent to the step of updating the QCI, the computer system detecting one or more devices included in the devices becoming disconnected from the one or more access points, leaving a proper subset of the devices connected to the one or more access points, the proper subset of the devices being operated by a proper subset of the users;
the computer system determining that the proper subset of the users has a second total number of users that does not exceed the expected number people by at least the threshold amount; and
in response to determining that the proper subset of the users has the second total number of users that does not exceed the expected number of people by at least the threshold amount, the computer system restoring the QCI to the normal setting.

15. The computer system of claim 14, wherein the method further comprises the step of based on the data access patterns, the computer system determining a type of an event for which the gathering of people has assembled, wherein the step of updating the QCI is further based on the type of the event.

16. The computer system of claim 15, wherein the method further comprises the step of based on the type of the event, the gathering of people being detected, and the data access patterns of the devices, the computer system predicting the bandwidth requirements of the devices, wherein the step of updating the QCI is performed to satisfy the predicted bandwidth requirements in response to the step of predicting the bandwidth requirements of the devices.

17. The computer system of claim 14, wherein the method further comprises the steps of:
using other historical data, the computer system determining historical data access patterns of the devices;
using calendars of the users, the computer system determining a type of an event for which the gathering of people has assembled and determining a timeline of the gathering of people; and
based on the historical data access patterns of the devices, the type of the event, and the timeline of the gathering, the computer system determining the bandwidth requirements of the devices.

18. The computer system of claim 17, wherein the method further comprises the steps of:
based on the historical data access patterns of the devices and the type of the event, the computer system prioritizing the devices; and
based on the prioritized devices, the computer system allocating bandwidth to the devices to satisfy the bandwidth requirements of the devices.

19. The computer system of claim 14, wherein the method further comprises the steps of:

the computer system determining a specified usage pattern for a device included in the devices; and in response to the step of determining the specified usage pattern, the computer system dynamically switching channels for the device to be compliant with a guaranteed bit rate, which reduces packet error.

20. A computer-implemented method comprising the steps of:

determining, by one or more processors, types of gatherings by employing training classifiers;

generating, by the one or more processors, quality of service class identifier (QCI) policies based on the types of gatherings by employing supervised learning, the QCI policies associating the types of gatherings with respective QCI values;

detecting, by the one or more processors, a group of users by detecting devices connected to one or more access points of a network, the devices being operated by the users in the group of users;

detecting, by the one or more processors, respective locations of the devices;

in response to detecting the group of users and detecting the locations of the devices, detecting, by the one or more processors, respective data access patterns of the devices;

determining, by the one or more processors, that the group of users has a total number of users that exceeds a threshold number of users;

based on (i) the detected data access patterns, (ii) the group of users having the total number of users exceeding the threshold number of users, and (iii) the QCI policies, updating, by the one or more processors, a QCI value included in the QCI values from a normal setting to a new setting to satisfy bandwidth requirements of the devices on a channel in the network;

subsequent to the step of updating the QCI value, monitoring, by the one or more processors, network traffic across the channel by employing inline stream classifiers;

based on the monitored network traffic, detecting, by the one or more processors, a change in contents of one or more dedicated traffic channels;

based on the change in the contents of the one or more dedicated traffic channels, sending, by the one or more processors, a command to an event validation manager in a 5G service orchestration to determine whether the group of users has dispersed;

based on a computation by the event validation manager of new bandwidth requirements of one or more devices connected to the one or more access points, determining, by the one or more processors, that the group of users has dispersed; and in response to the determining that the group of users has dispersed, restoring the QCI value to the normal setting.

21. A computer program product comprising:

a computer readable storage medium having computer readable program code stored on the computer readable storage medium, the computer readable program code being executed by a central processing unit (CPU) of a computer system to cause the computer system to perform a method comprising the steps of:

the computer system determining types of gatherings by employing training classifiers;

the computer system generating quality of service class identifier (QCI) policies based on the types of gatherings by employing supervised learning, the QCI policies associating the types of gatherings with respective QCI values;

the computer system detecting a group of users by detecting devices connected to one or more access points of a network, the devices being operated by the users in the group of users;

the computer system detecting respective locations of the devices;

in response to detecting the group of users and detecting the locations of the devices, the computer system detecting respective data access patterns of the devices;

the computer system determining that the group of users has a total number of users that exceeds a threshold number of users;

based on (i) the detected data access patterns, (ii) the group of users having the total number of users exceeding the threshold number of users, and (iii) the QCI policies, the computer system updating a QCI value included in the QCI values from a normal setting to a new setting to satisfy bandwidth requirements of the devices on a channel in the network;

subsequent to the step of updating the QCI value, the computer system monitoring network traffic across the channel by employing inline stream classifiers;

based on the monitored network traffic, the computer system detecting a change in contents of one or more dedicated traffic channels;

based on the change in the contents of the one or more dedicated traffic channels, the computer system sending a command to an event validation manager in a 5G service orchestration to determine whether the group of users has dispersed;

based on a computation by the event validation manager of new bandwidth requirements of one or more devices connected to the one or more access points, the computer system determining that the group of users has dispersed; and in response to the determining that the group of users has dispersed, the computer system restoring the QCI value to the normal setting.

* * * * *